(12) United States Patent
Park

(10) Patent No.: US 11,192,453 B2
(45) Date of Patent: Dec. 7, 2021

(54) ECO-FRIENDLY VEHICLE AND HILL DESCENT CONTROL METHOD FOR THE SAME

(71) Applicants: Hyundai Motor Company, Seoul (KR); Kia Motors Corporation, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 16/595,994

(22) Filed: Oct. 8, 2019

(65) Prior Publication Data

US 2020/0171956 A1 Jun. 4, 2020

(30) Foreign Application Priority Data

Dec. 3, 2018 (KR) .......................... 10-2018-0153704

(51) Int. Cl.
*B60L 7/26* (2006.01)
*B60T 13/58* (2006.01)
(Continued)

(52) U.S. Cl.
CPC ........ *B60L 7/26* (2013.01); *B60T 8/17* (2013.01); *B60T 8/171* (2013.01); *B60T 8/245* (2013.01);
(Continued)

(58) Field of Classification Search
CPC .... B60T 2201/04; B60T 13/586; B60T 8/245; B60T 8/17; B60T 8/171; B60T 2270/604; B60T 2210/20; B60T 2240/00; B60T 2250/04; B60L 7/26; B60L 2240/642; B60K 7/0007; B60W 20/00; B60W 2552/15; B60W 30/143
See application file for complete search history.

(56) References Cited

U.S. PATENT DOCUMENTS

2011/0010065 A1* 1/2011 Bach ................. B60K 31/04
701/70
2013/0338852 A1* 12/2013 Otake ............... G08G 1/09626
701/1

(Continued)

*Primary Examiner* — Geepy Pe
*Assistant Examiner* — Kyle J Kingsland
(74) *Attorney, Agent, or Firm* — Mintz Levin Cohn Ferris Glovsky and Popeo, P.C.; Peter F. Corless

(57) ABSTRACT

An eco-friendly vehicle and a hill descent control method therefor are provided to enable stable driving on a downhill road. The method includes detecting a downhill road inclination based on a request for hill descent control and determining an average inclination and an inclination variation width based on the recognized downhill road inclination. First braking force of a main braking source from a motor and a hydraulic pressure brake system based on the average inclination and the inclination variation width, and second braking force of an auxiliary braking source from the motor and the hydraulic pressure brake system for each driving wheel based on a target speed set with respect to the hill descent control and a speed of each driving wheel are determined. The first and second braking force are output by a corresponding braking source from the motor and the hydraulic pressure brake system.

19 Claims, 12 Drawing Sheets

(51) Int. Cl.
*B60T 8/24* (2006.01)
*B60T 8/17* (2006.01)
*B60T 8/171* (2006.01)
*B60K 7/00* (2006.01)
*B60W 20/00* (2016.01)

(52) U.S. Cl.
CPC .......... B60T 13/586 (2013.01); *B60K 7/0007* (2013.01); *B60T 2201/04* (2013.01); *B60T 2210/20* (2013.01); *B60T 2240/00* (2013.01); *B60T 2250/04* (2013.01); *B60T 2270/604* (2013.01); *B60W 20/00* (2013.01)

(56) References Cited

U.S. PATENT DOCUMENTS

| | | | | |
|---|---|---|---|---|
| 2018/0319397 A1* | 11/2018 | Ohta | .................... | B60W 30/14 |
| 2019/0001984 A1* | 1/2019 | Huh | .................... | B60W 20/15 |
| 2019/0135265 A1* | 5/2019 | Shin | .................... | B60W 10/06 |
| 2020/0031357 A1* | 1/2020 | Ling | .................... | B60L 3/108 |

* cited by examiner

ECO-FRIENDLY VEHICLE AND HILL DESCENT CONTROL METHOD FOR THE SAME

CROSS REFERENCE TO RELATED APPLICATION(S)

This application claims the benefit of Korean Patent Application No. 10-2018-0153704, filed on Dec. 3, 2018, which is hereby incorporated by reference as if fully set forth herein.

BACKGROUND

Field of the Invention

The present invention relates to an eco-friendly vehicle and a hill descent control method for the same, for enabling stable and effective driving on a downhill road.

Discussion of the Related Art

Recently developed vehicles include various driving convenience functions through electronic equipment. One of these driving convenience functions may be a hill descent control (HDC) function, which will be described with reference to FIG. 1 according to the related art.

FIG. 1 is a diagram for explanation of a concept of a general HDC function. The HDC function may be a convenience function that is mainly applied to four wheel drive (4WD) vehicles appropriate for driving on a rough road and may independently and automatically control brakes of four wheels to enable a vehicle to drive at constant speed during driving on a steep downhill road. Accordingly, a vehicle is capable of stably driving even in a poor road state through the corresponding function.

Recently, as interest in environment concerns has increases, research has been conducted on eco-friendly vehicles. Representative examples of the eco-friendly vehicle may be an electric vehicle (EV) and a hybrid electric vehicle (HEV). In general, a hybrid electric vehicle (HEV) refers to a vehicle that uses two power sources that mainly include an engine and an electric motor. An HEV has excellent fuel efficiency and engine performance compared with a vehicle including only an internal combustion engine and is also advantageous for reducing emissions and, thus, has been actively developed recently.

The hybrid electric vehicle (HEV) and the electric vehicle (EV) may commonly include a driving electric motor, may apply counter torque to an electric motor to execute a power generation mode in a brake or deceleration state and, thus, may embody a regenerative brake function of collecting kinetic energy of a vehicle to charge a battery. The regenerative brake function will be described with reference to FIG. 2 according to the related art.

FIG. 2 illustrates an example of distribution of braking force of a general eco-friendly vehicle. Referring to FIG. 2, an eco-friendly vehicle including a driving electric motor forms the sum of hydraulic brake for applying brake torque using frictional force based on hydraulic pressure and regenerative brake using counter torque of the motor, as total braking force. In particular, in general, a brake controller is configured to calculate total required braking force and, in this case, a predetermined portion of the calculated total required braking force is met by regenerative brake and the remaining insufficient braking force is met by hydraulic brake.

Distribution of such regenerative brake may be performed to be used to a maximum degree within a limit of power components to increase fuel efficiency. However, different from frictional force, when substantial counter torque is applied to a motor in a low speed region (e.g., less than about 3 to 5 kph), backward movement may occur due to inertia and, thus, regenerative torque is reduced from the low speed region to enhance stable brake sense. A general eco-friendly vehicle may also embody a HDC function but, the aforementioned regenerative brake may not be applied to the vehicle, which will be described with reference to FIG. 3 according to the related art.

FIG. 3 is a diagram for explanation of a problem due to application of regenerative brake when a general eco-friendly vehicle embodies a HDC function. Referring to FIG. 3, when a road inclination is irregularly changed around an average inclination, a total brake amount may also be rapidly changed to maintain the same speed. When regenerative brake is applied according to general control in this situation, whenever the total brake amount is changed past a regenerative brake limit, brake performance is degraded by alternation of hydraulic brake and regenerative brake. Accordingly, in general, regenerative brake is not applied to an eco-friendly vehicle while HDC is applied.

SUMMARY

Accordingly, the present invention is directed to an eco-friendly vehicle and a hill descent control method for the same that substantially obviates one or more problems due to limitations and disadvantages of the related art. An object of the present invention is to provide an eco-friendly vehicle and a hill descent control method for the same, for performing a hill descent control (HDC) function by a motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a hill descent control method of an eco-friendly vehicle may include recognizing a downhill road inclination in response to a request for hill descent control, determining an average inclination and an inclination variation width based on the recognized downhill road inclination, determining first braking force of a main braking source from a motor and a hydraulic pressure brake system based on the average inclination and the inclination variation width, determining second braking force of an auxiliary braking source from the motor and the hydraulic pressure brake system for each driving wheel based on a target speed set with respect to the hill descent control and a speed of each driving wheel, and outputting the first braking force and the second braking force by a corresponding braking source from the motor and the hydraulic pressure brake system.

In another aspect of the present invention, an eco-friendly vehicle may include a first controller configured to recognize a downhill road inclination in response to a request for hill descent control, determine an average inclination and an inclination variation width based on the recognized downhill road inclination, determine first braking force of a main braking source from a motor and a hydraulic pressure brake system based on the average inclination and the inclination variation width, and determine second braking force of an auxiliary braking source from the motor and the hydraulic pressure brake system for each driving wheel based on a target speed set with respect to the hill descent control and a speed of each driving wheel. The vehicle further includes a second controller configured to operate the motor to output any corresponding one of the first braking force and the second braking force, and a third controller configured to operate the hydraulic pressure brake system to output another corresponding one of the first braking force and the second braking force.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
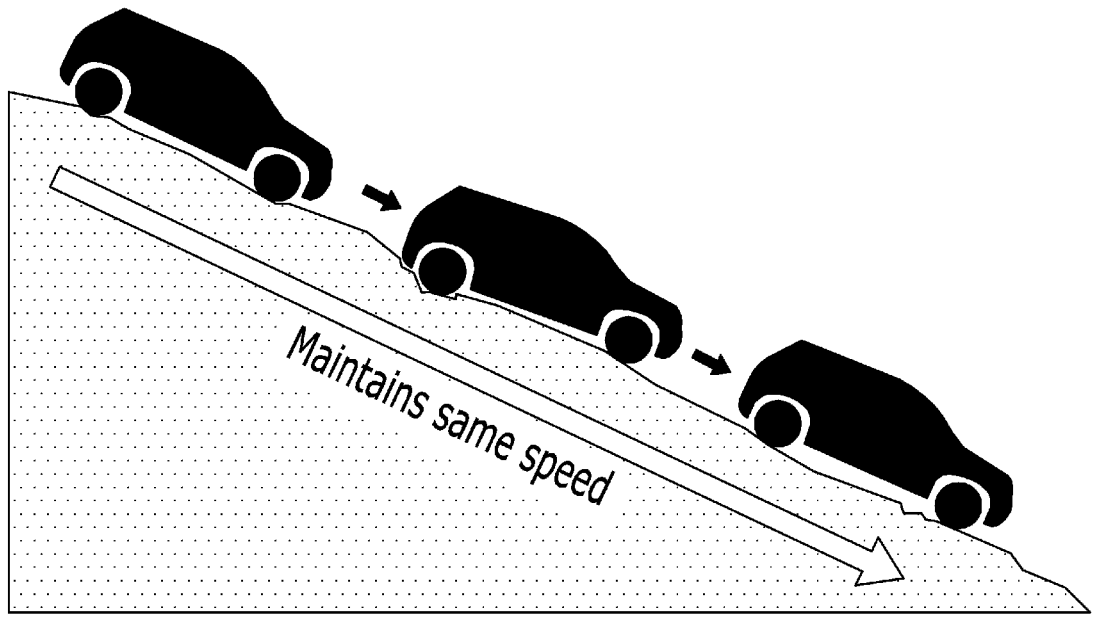
FIG. 1 is a diagram for explanation of a concept of a general hill descent control (HDC) function according to the related art.
Figure 2:
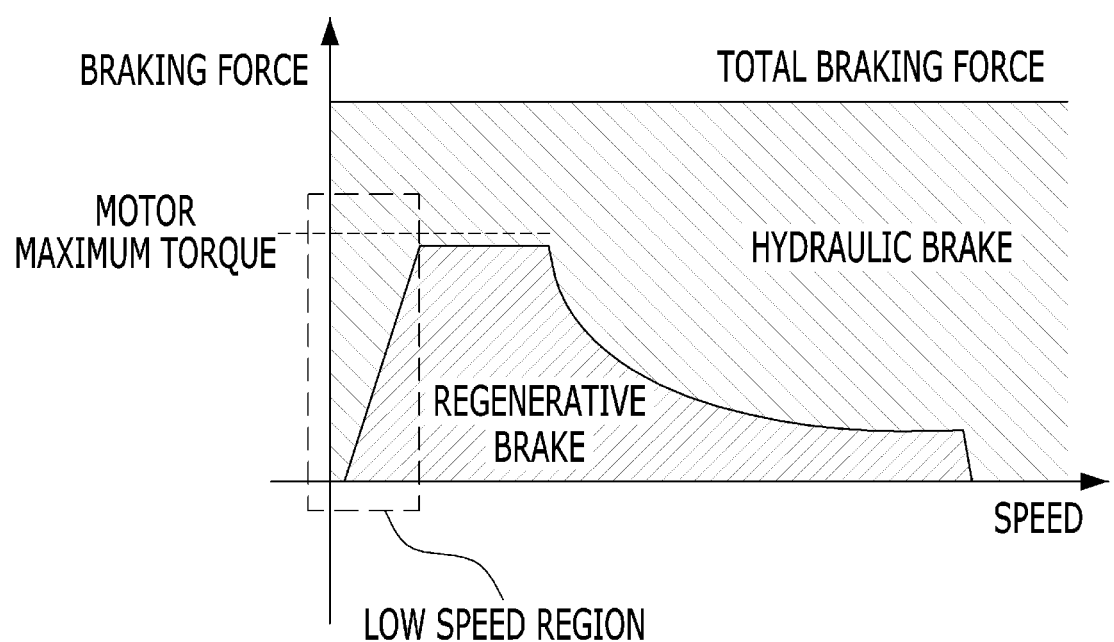
FIG. 2 illustrates an example of distribution of braking force of a general eco-friendly vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described in detail so as for those of ordinary skill in the art to easily implement with reference to the accompanying drawings. However, the present invention may be implemented in various different forms and is not limited to these embodiments. To clearly describe the present invention, a part without concerning to the description is omitted in the drawings, and like reference numerals in the specification denote like elements. The same reference numbers will be used throughout the drawings and the specification to refer to the same parts.

According to proposals of exemplary embodiments of the present invention, a main braking source for providing continuous braking force according to the configuration of a powertrain of an eco-friendly vehicle and an auxiliary braking source for independently distributing braking force to each vehicle wheel and satisfying total braking force to help the main braking source with braking force may be determined during driving on a downhill road and, in this case, any one of the main braking source and the auxiliary braking source may be embodied via regenerative brake using a motor.

Figure 4:
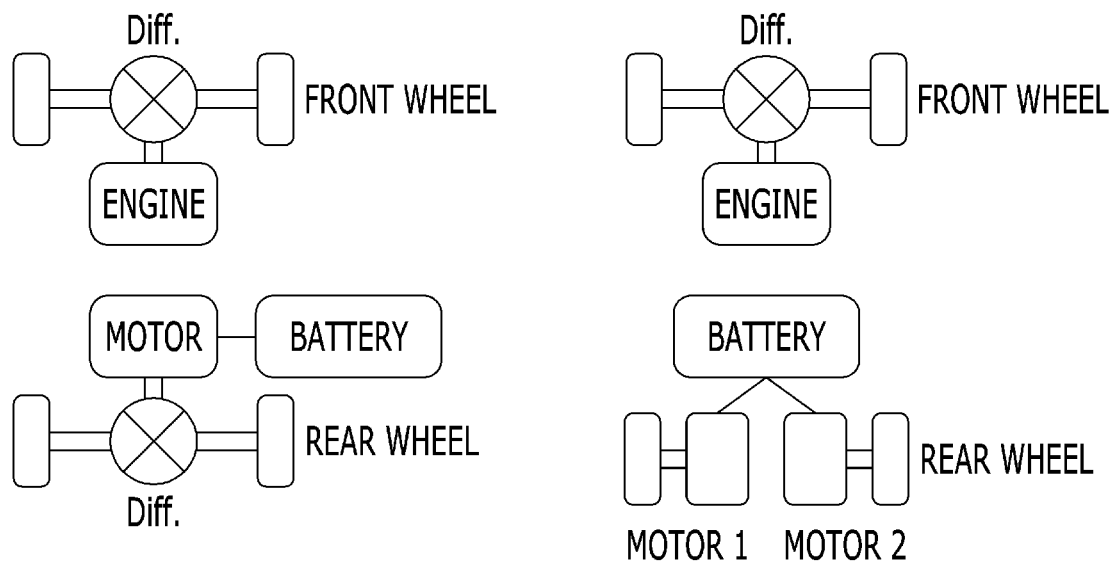
FIG. 4 is a diagram for explanation of the configuration of a powertrain of an eco-friendly vehicle applicable to exemplary embodiments of the present invention.

Prior to a description of a hill decent control method according to exemplary embodiments of the present invention, the configuration of a powertrain of an eco-friendly vehicle applicable to the exemplary embodiments will be described with reference to FIG. 4. FIG. 4 is a diagram for explanation of the configuration of a powertrain of an eco-friendly vehicle applicable to exemplary embodiments of the present invention.

FIG. 4 illustrates two configurations of a powertrain of an eco-friendly vehicle for enabling four wheel drive (4WD). The configurations of the powertrain shown in FIG. 4 use an electric motor and a battery supplying power to the electric motor and, thus, are also referred to as "e4WD".

First, the powertrain shown in a left side of FIG. 4 may be configured in such a way that front wheels are driven by an engine and rear wheels are driven by one electric motor. In particular, the rear wheels are connected to the motor through a differential gear (Diff.) and, thus, the same torque may be transferred to two vehicle wheels at the rear wheel. Accordingly, in the powertrain configuration, it may not be possible to independently apply regenerative brake torque to each vehicle wheel and, thus, a hydraulic brake may be an auxiliary braking source and a regenerative brake may be a main braking source.

Hereinafter, the powertrain shown in a right side of FIG. 4 may have similar driving subjects of the front wheel and the rear wheel to those of the powertrain shown in the left side. However, two vehicle wheels at the rear wheel may separately include a motor (e.g., an in-wheel motor). In other words, a left wheel may be driven by a motor 1 and a right wheel may be driven by a motor 2. Accordingly, in the powertrain configuration, it may be possible to independently apply regenerative brake torque to each vehicle wheel and, thus, a hydraulic brake may be a main braking source and a regenerative brake may be an auxiliary braking source. Needless to say, the converse may be possible.

The powertrain shown in FIG. 4 includes an engine and, thus, may be embodied in the form of a hybrid electric vehicle (HEV) but, exemplary embodiments of the present invention may also be applied to an electric vehicle (EV) without an engine as long as a current situation is a hill descent control situation in which only braking force but not driving force is applied.

Figure 5:
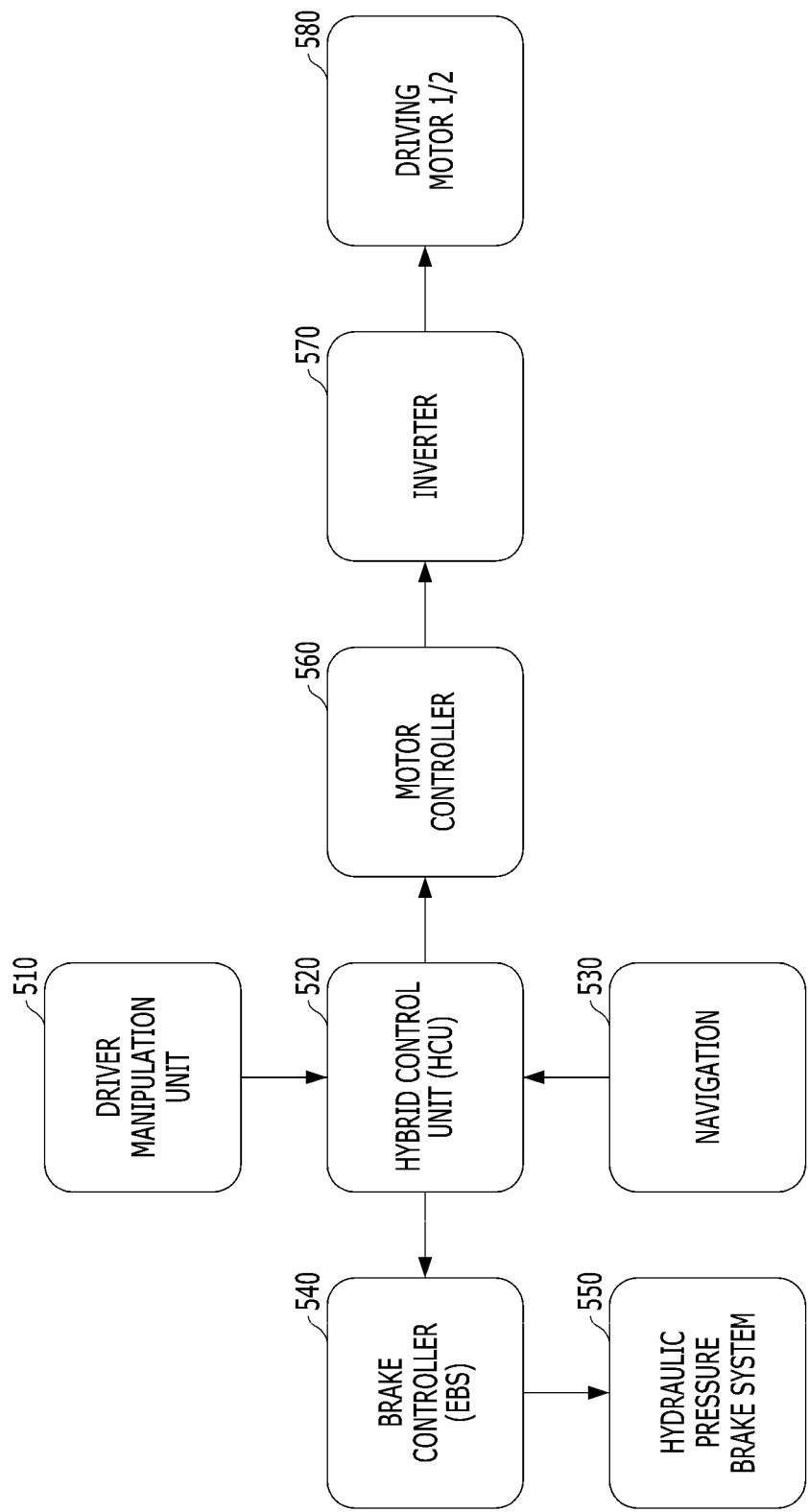
FIG. 5 is a block diagram showing an example of the configuration of a vehicle according to an exemplary embodiment of the present invention.

Hereinafter, the configuration of a vehicle for performing a hill descent control method according to an exemplary embodiment will be described with reference to FIG. 5. FIG. 5 is a block diagram showing an example of the configuration of a vehicle according to an exemplary embodiment of the present invention. Referring to FIG. 5, an eco-friendly vehicle according to an exemplary embodiment may include a driver manipulation unit 510, a hybrid control unit (HCU) 520, a navigation system 530, a brake controller 540, a hydraulic pressure brake system 550, a motor controller 560, an inverter 570, and a driving motor 580. The various components may be operated by an overall controller having a processor and a memory.

Particularly, the driver manipulation unit 510 may not be limited to a particular form as long as the driver manipulation unit 510 is capable of receiving a command for determining whether an HDC function is set, from a driver. The HCU 520 may be configured to determine the main braking source and the auxiliary braking source for embodying braking force for tracking a target speed based on an inclination of a road when the driver manipulation unit 510 sets an HDC function and may be configured to determine and correct braking force of each braking source.

The navigation system 530 may be configured to provide inclination information of a road to the hybrid controller 520. In some exemplary embodiments, the navigation system 530 may also be omitted. The brake controller 540 may be embodied in the form of an electronic braking system (EBS), and according to determination of the hybrid controller 520, the brake controller 540 may be configured to operate the hydraulic pressure brake system 550 to execute a hydraulic brake amount.

A motor control unit (MCU) 560 may be configured to operate the inverter 570 that supplies alternating current (AC) power to the driving motor 580 based on the determination of the hybrid controller 520 and may be configured to operate a driving motor 580 to execute a regenerative brake amount. One driving motor 580 may be configured in the configuration of the vehicle shown in the left side of FIG. 4 and two of total driving motors 580 may be configured for each wheel in the configuration of the vehicle shown in the right side of FIG. 4.

Figure 6:
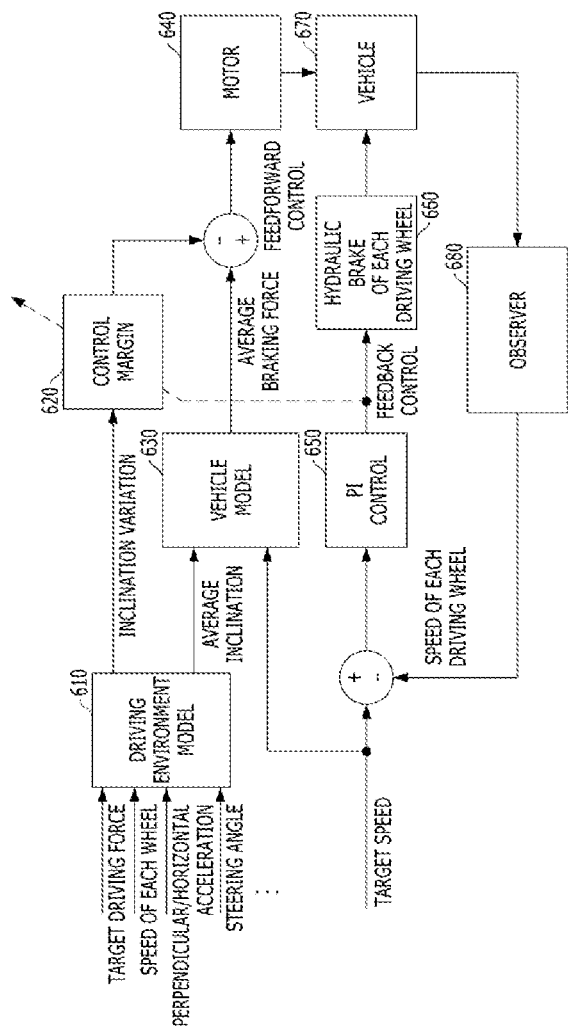
FIG. 6 illustrates an example of a hill descent control logic model according to an exemplary embodiment of the present invention.

Hereinafter, hill descent control logic will be described based on the aforementioned vehicle configuration. FIG. 6 illustrates an example of a hill descent control logic model according to an exemplary embodiment of the present invention. The logic model shown in FIG. 6 may be applied when a powertrain configuration is not capable of separately adjusting torque for driving wheels at opposite sides using a motor like in the left side of FIG. 4.

In the control logic model, the motor may be configured to provide average braking force based on an average inclination, and a hydraulic pressure brake system of each driving wheel may be configured to perform control of separate braking force of each driving wheel, which includes posture control as feedback control. In other words, in the present control logic model, the motor may be a main braking source and the hydraulic pressure brake system may be an auxiliary braking source.

Referring to FIG. 6, a driving environment model 610 may be generated through sensor information such as target driving force, each wheel speed, perpendicular/horizontal acceleration, or steering angle. When the driving environment model 610 acquires average inclination information of a currently driving road, average braking force based on a vehicle model 630 may be acquired using target speed together. When a control margin is determined based on an inclination variation (i.e., an inclination variation width) acquired by the driving environment model 610, regenerative braking force to be executed by a motor 640 may be determined via feedforward control based on a difference between the average braking force and the control margin.

A hydraulic brake amount by which speed of each driving wheel based on target speed and a behavior of an actual vehicle 670 is to be executed through a hydraulic brake 660 of each driving wheel as a feedback through a proportional-integral (PI) control 650 may be acquired. In particular, the feedback information of the PI control 650 may be base information for correcting the control margin 620. A behavior of a vehicle 670 based on a total brake amount executed through the motor 640 and the hydraulic brake 660 of each driving wheel may be fed back again at each driving wheel speed through an observer 680.

The form of brake according to the control logic model shown in FIG. 6 will be described with reference to FIG. 7.

Figure 3:
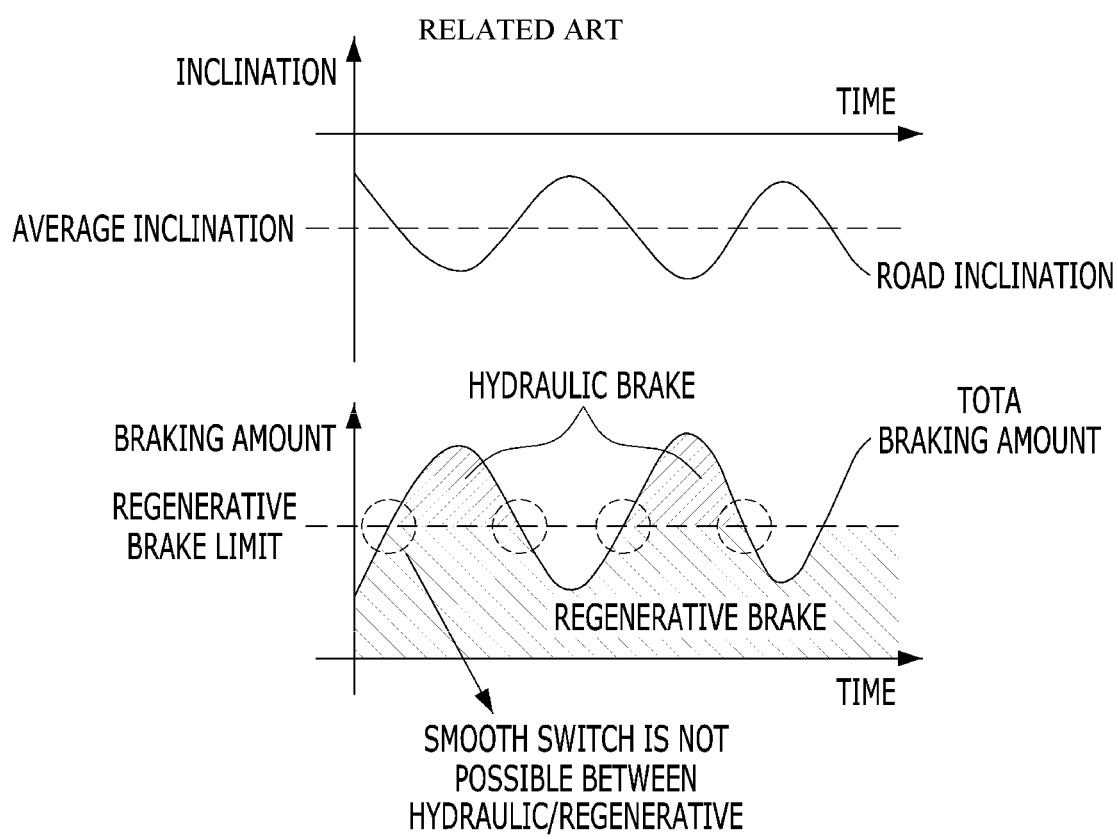
FIG. 3 is a diagram for explanation of a problem due to application of regenerative brake when a general eco-friendly vehicle embodies a HDC function according to the related art.
Figure 7:
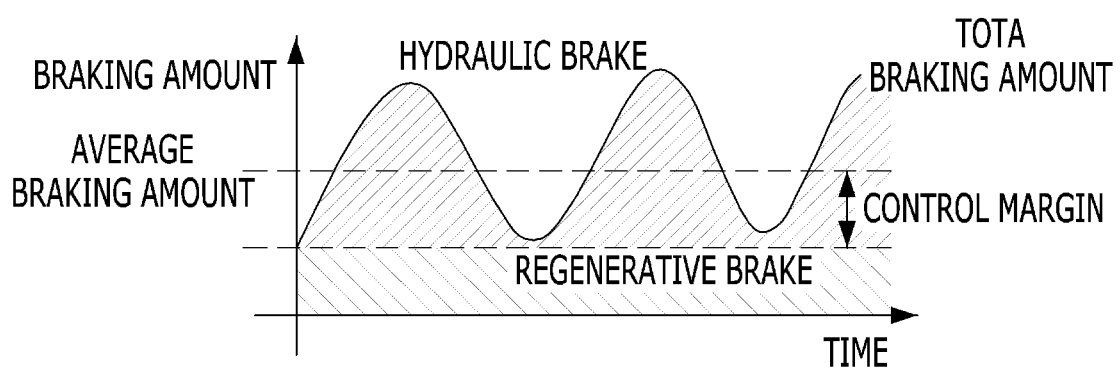
FIG. 7 is a diagram showing an example of the form of embodying a total brake amount according to an exemplary embodiment of the present invention.

FIG. 7 is a diagram showing an example of the form of embodying a total brake amount according to an exemplary embodiment of the present invention. Referring to FIG. 7, a brake amount obtained by subtracting control margin from the average brake amount may be executed through regenerative brake and, a total brake amount may be satisfied via variation of a hydraulic brake amount. Accordingly, regenerative brake may also be applied to an HDC function and hydraulic brake and regenerative brake are not alternated and, thus, the problem shown in FIG. 3 does not occur.

Figure 8:
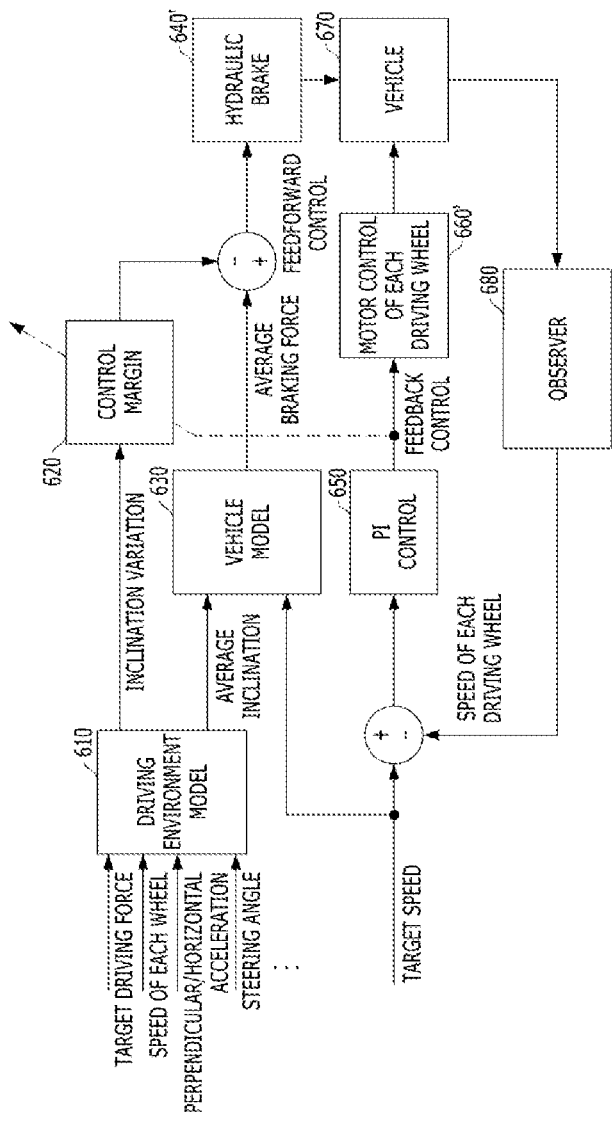
FIG. 8 is a diagram showing another example of a hill descent control logic model according to an exemplary embodiment of the present invention.

FIG. 8 is a diagram showing another example of a hill descent control logic model according to an exemplary embodiment of the present invention. The logic model shown in FIG. 8 may be applied when a powertrain configuration is capable of separately adjusting torque for driving wheels at opposite sides using a motor like in the right side of FIG. 4. In the control logic model, the hydraulic brake may be configured to provide average braking force based on an average inclination, and a motor of each driving wheel may be configured to perform control of separate braking force of each driving wheel, which includes posture control as feedback control. In other words, in the present control logic model, the motor may be an auxiliary braking source and the hydraulic pressure brake system may be a main braking source.

Comparing the model configuration of FIG. 8 with that of FIG. 6, the model configurations are the same except that a feedback control target of the PI control 650 is motor control 660' of each driving wheel and an executing subject of average braking force is substituted with hydraulic brake 640' and, thus, a repeated description is omitted.

Figure 9:
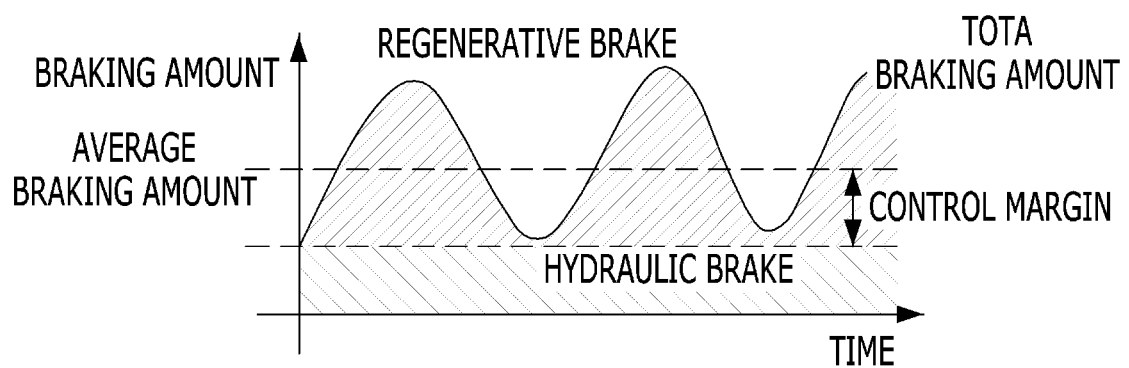
FIG. 9 is a diagram showing another example of the form of embodying a total brake amount according to an exemplary embodiment of the present invention.

The form of brake according to the control logic model shown in FIG. 8 will be described with reference to FIG. 9. FIG. 9 is a diagram showing another example of the form of embodying a total brake amount according to an exemplary embodiment of the present invention. Referring to FIG. 9, a brake amount obtained by subtracting control margin from the average brake amount may be executed through hydraulic brake and, a total brake amount may be satisfied via variation of a regenerative brake amount. Accordingly, regenerative brake may also be applied to an HDC function and hydraulic brake and regenerative brake are not alternated and, thus, the problem shown in FIG. 3 does not occur.

Figure 10:
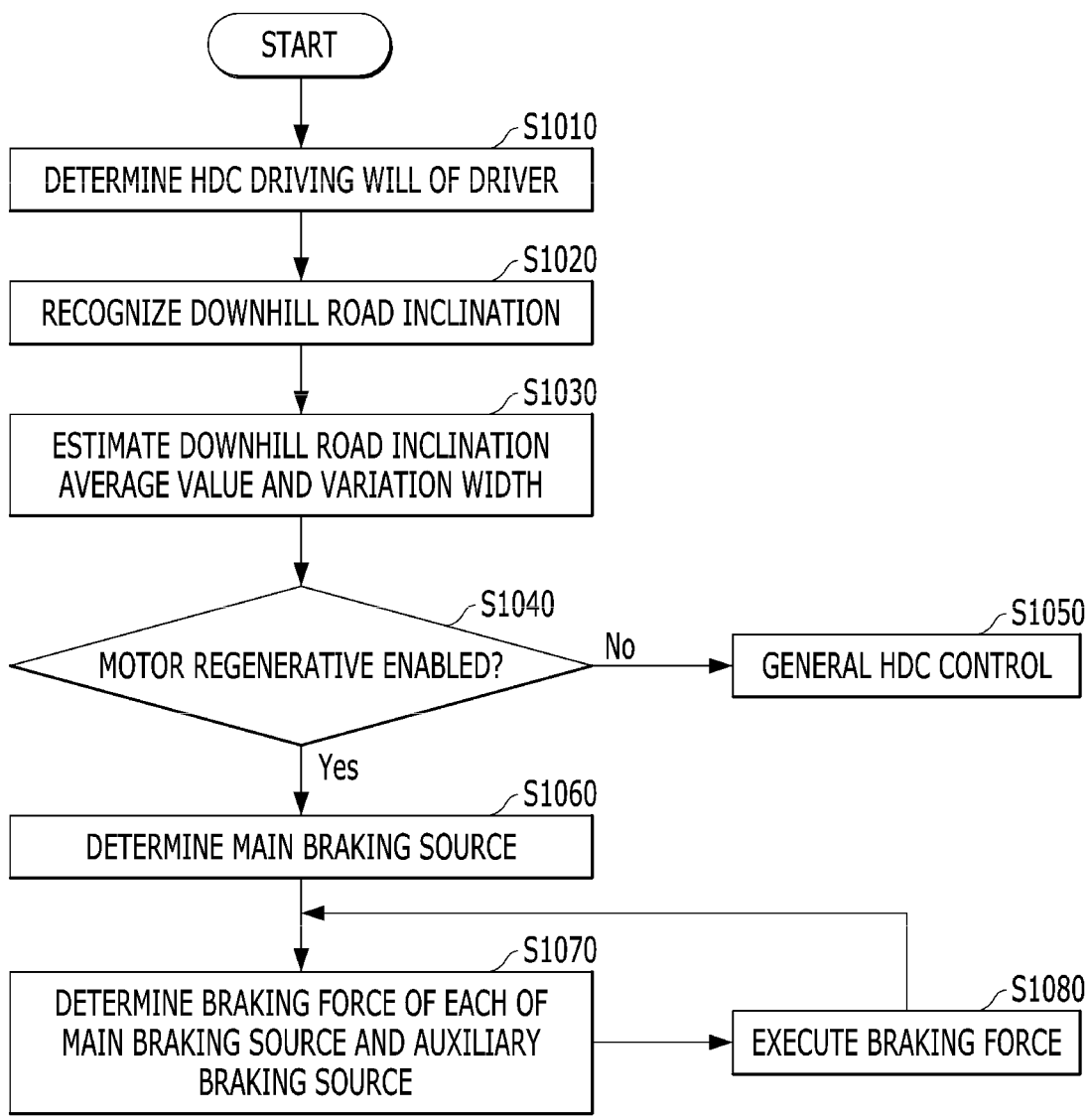
FIG. 10 is a flowchart showing an example of a hill decent control procedure according to an exemplary embodiment of the present invention.

Hereinafter, the aforementioned control procedure will be described with reference to a flowchart. FIG. 10 is a flowchart showing an example of a hill decent control procedure according to an exemplary embodiment of the present invention. Referring to FIG. 10, first, the hybrid controller 520 may be configured to determine a HDC driving intent of a driver (S1010). In the present operation, the HDC driving intent may be determined based on receiving a command for activating an HDC function input through the driver manipulation unit 510.

Figure 11:
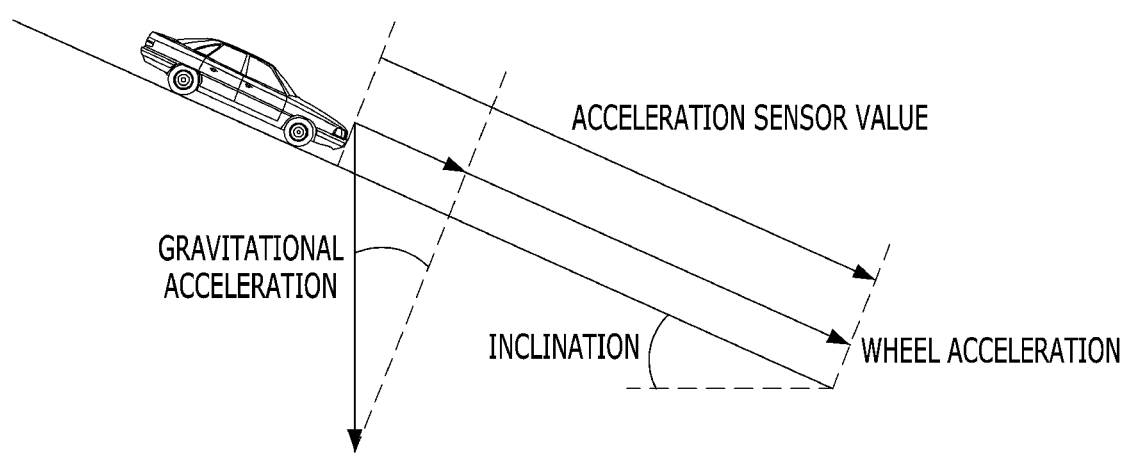
FIG. 11 is a diagram for explanation of a physical factor for recognition of a downhill road inclination according to an exemplary embodiment of the present invention.

When there is the HDC driving intent of the driver (i.e., when there is a request for hill descent control), the hybrid controller 520 may be configured to recognize a downhill road inclination (S1020). The downhill road inclination may be estimated through an acceleration sensor value or a wheel speed value measured through a wheel speed sensor of each wheel. FIG. 11 is a diagram for explanation of a physical factor for recognition of a downhill road inclination according to an exemplary embodiment of the present invention.

Referring to FIG. 11, an acceleration sensor value detected by an acceleration sensor while the vehicle is being driven on a downhill road may be a value obtained by adding a driving direction component of gravitational acceleration to wheel acceleration. Accordingly, when wheel acceleration is subtracted from the acceleration sensor value, the driving direction component of the gravitational acceleration may be acquired, and an inclination may be obtained according to "arcsin (acceleration sensor value-wheel acceleration)". Particularly, the wheel acceleration may be acquired according to "d/dt (average wheel speed of four wheels)". The present operation may be performed with a predetermined period or may be continuously performed in real time. The present operation may also be performed using detailed map data instead of a sensor value or using the detailed map data with the sensor value. In particular, the detailed map data may be acquired from the navigation system 530 or may be acquired from an external object via V2X communication.

Figure 12:
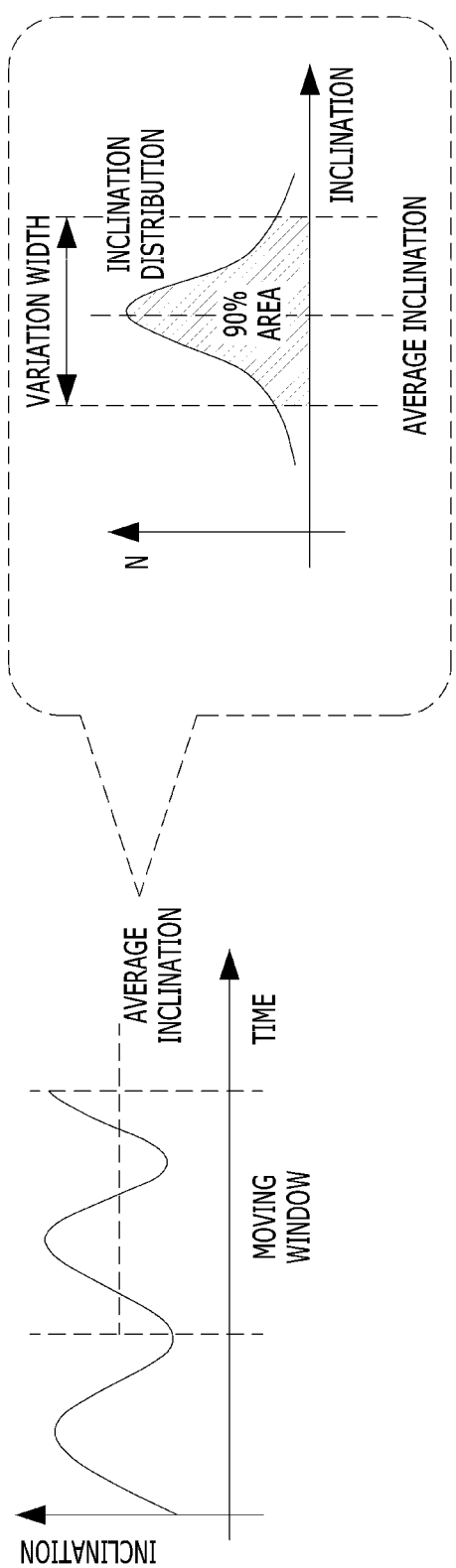
FIG. 12 is a diagram for explanation of an average inclination according to an exemplary embodiment of the present invention.

Referring back to FIG. 10, the hybrid controller 520 may be configured to acquire a downhill road inclination average value based on a downhill road inclination to estimate a variation width (S1030). The downhill road inclination average value, that is, an average inclination will be described with reference to FIG. 12. FIG. 12 is a diagram for explanation of an average inclination according to an exemplary embodiment of the present invention. Referring to FIG. 12, the hybrid controller 520 may be configured to estimate an inclination average value and an inclination variation width within a moving window having has a predetermined length and is moved along with the flow of time.

Particularly, the downhill road inclination average value may be an average of measured inclination values included in the window, and the variation width may be calculated based on data (e.g., data corresponding to about 90% of measured inclination values based on the average inclination) with predetermined reliability in distribution of measured values in the window. The present procedure may be a procedure of a calculating a deviation range of braking force that is to be irregularly generated in the future in each vehicle wheel with the road inclination variation width up to present, and the estimated value of the variation width may correspond to the control margin in FIGS. 6 to 9.

Referring back to FIG. 10, the hybrid controller 520 may be configured to determine whether regenerative brake is enabled through an electric motor (S1040). When a state of charge (SoC) of a battery is excessive or a power component such as the motor 580, inverter 570, battery is in a high-temperature state, regenerative brake is not enabled and thus, the controller may be configured to determine whether regenerative brake is enabled through an electric motor. As the determination result, when regenerative brake is not enabled (NO of S1040), the hybrid controller 520 may be configured to perform a general HDC function for embodying total brake torque using only frictional brake without application of regenerative brake (S1050).

On the other hand, when regenerative brake is enabled (YES of S1040), the hybrid controller 520 may be configured to select a main braking source and an auxiliary braking source (S1060). In particular, a brake system for independently distributing braking force to each wheel may be the auxiliary braking source, and a brake system that continuously provides most braking force may be a main braking source. For example, in the powertrain shown in the left side of FIG. 4, the motor may be the main braking source and the hydraulic pressure brake system may be an auxiliary braking source. In the powertrain shown in the right side of FIG. 4, the motor may be the auxiliary braking source, and the hydraulic pressure brake system may be the main braking source.

The hybrid control unit (HCU) 520 may be configured to determine braking force of each of the main braking source and the auxiliary braking source as a function for each brake source is determined (S1070). In particular, the main braking source may be operated using a feedforward method to satisfy braking force obtained by excluding a road variation width estimated value from the average inclination. For example, braking force managed by the main braking source may be acquired according to "M*g*sin(inclination-variation width)" wherein M is a vehicle weight and g is gravitational acceleration.

The auxiliary braking source may embody braking force based on a feedback to enable each driving wheel to drive at a target speed preset in an HDC function. The target speed preset in the HDC function may be a constant value of about 3 to 8 kph but is not limited thereto. Speed error in feedback control may be a value obtained by subtracting a current linear speed of a vehicle wheel from the target speed, and brake torque may be independently determined with respect to each driving wheel to reduce the speed error. When a hybrid controller determines braking force (i.e., brake torque) of each braking source, each determined brake torque may be transmitted to the brake controller 540 and the motor controller 560, and each controller may be configured to output frictional braking force and regenerative braking force, which correspond to the determined brake torque (S1080).

According to the exemplary embodiments of the present invention that has been described thus far, braking force for HDC control that was performed along by a hydraulic pressure system and a mechanical friction material may be distributed to a driving motor and, thus, HDC control may enabled by a motor, thereby enhancing adjustment stability. The exemplary embodiments of the present invention may reduce a burden of hydraulic pressure brake and may be advantageous in terms of management of a temperature and durability of a friction material. In addition, it may be possible to collect energy even in an extreme road situation and, thus, ascending capability on a next uphill road may be expected to be enhanced and fuel efficiency may also be enhanced.

The above configured eco-friendly vehicle related to at least one of the present invention may enable hill descent control using a motor, thereby enhancing adjustment stability. The exemplary embodiments of the present invention may reduce a burden of hydraulic pressure brake in a downhill road situation and may be advantageous in terms of management of a temperature and durability of a friction material. In addition, it may be possible to collect energy even in an extreme road situation and fuel efficiency may also be enhanced.

It will be appreciated by persons skilled in the art that that the effects that could be achieved with the present invention are not limited to what has been particularly described hereinabove and other advantages of the present invention will be more clearly understood from the detailed description.

The aforementioned present invention may also be embodied as computer readable code stored on a non-transitory computer readable recording medium. The non-transitory computer readable recording medium is any data storage device that may store data which can thereafter be read by a computer. Examples of the non-transitory computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A hill descent control method of an eco-friendly vehicle, comprising:
   detecting, by a controller, a downhill road inclination in response to a request for hill descent control;
   determining, by the controller, an average inclination and an inclination variation width based on the recognized downhill road inclination;
   determining, by the controller, first braking force of a main braking source from a motor or a hydraulic pressure brake system based on the average inclination and the inclination variation width;
   determining, by the controller, second braking force of an auxiliary braking source from the motor or the hydraulic pressure brake system for each driving wheel of driving wheels of the vehicle based on a target speed set with respect to the hill descent control and a speed of each of the driving wheels; and
   outputting, by the controller, the first braking force and the second braking force by a corresponding braking source from the motor and the hydraulic pressure brake system,
   wherein the inclination variation width corresponds to a deviation range calculated based on downhill road inclination distribution with a predetermined reliability factor based on the average inclination.

2. The method of claim 1, wherein, when the motor is connected to each of the driving wheels through a differential gear, the main braking source is the motor and the auxiliary braking source is the hydraulic pressure brake system.

3. The method of claim 1, wherein, when different motors are connected to each of the driving wheels, the main braking source is the hydraulic pressure brake system and the auxiliary braking source is the different motors connected to each of the driving wheels.

4. The method of claim 1, wherein the motor is configured to output any one of the first braking force and the second braking force through regenerative brake.

5. The method of claim 1, wherein detecting the downhill road inclination includes:
   obtaining, by the controller, wheel acceleration based on an average speed of four wheels included in the eco-friendly vehicle; and
   obtaining, by the controller, the downhill road inclination based on a value obtained by subtracting the wheel acceleration from an acceleration sensor value.

6. The method of claim 1, wherein determining the average inclination and the inclination variation width includes:
   obtaining, by the controller, the average inclination using an average of the downhill road inclination present in a moving window with a predetermined time length; and
   obtaining, by the controller, the inclination variation width based on the downhill road inclination distribution with the predetermined reliability factor based on the average inclination in the moving window,
   wherein the moving window corresponds to a time window that is continuously shifting to a more recent time.

7. The method of claim 1, wherein the first braking force corresponds to a value obtained by subtracting a control margin corresponding to the inclination variation width from braking force corresponding to the average inclination.

8. The method of claim 1, wherein determining the second braking force includes:
   obtaining, by the controller, speed error for each of the driving wheels by subtracting a linear speed for a vehicle wheel, obtained based on the speed for each of the driving wheels, from the target speed; and
   determining, by the controller, the second braking force for each of the driving wheels to reduce the speed error.

9. The method of claim 1, wherein: the first braking force is determined in the form of feedforward control; and the second braking force is determined in the form of feedback control.

10. A non-transitory computer readable recording medium having recorded thereon a program for executing the hill descent control method of an eco-friendly vehicle, the method comprising:
   detecting a downhill road inclination in response to a request for hill descent control;
   determining an average inclination and an inclination variation width based on the recognized downhill road inclination,
   determining first braking force of a main braking source from a motor or a hydraulic pressure brake system based on the average inclination and the inclination variation width;
   determining second braking force of an auxiliary braking source from the motor or the hydraulic pressure brake system for each driving wheel of the driving wheels of the vehicle based on a target speed set with respect to the hill descent control and a speed of each of the driving wheels;
   outputting the first braking force and the second braking force by a corresponding braking source from the motor and the hydraulic pressure brake system;
   wherein the inclination variation width corresponds to a deviation range calculated based on downhill road inclination distribution with a predetermined reliability factor based on the average inclination.

11. An eco-friendly vehicle, comprising:
   a first controller configured to:
      detect a downhill road inclination in response to a request for hill descent control;
      determine an average inclination and an inclination variation width based on the recognized downhill road inclination;
      determine first braking force of a main braking source from a motor or a hydraulic pressure brake system based on the average inclination and the inclination variation width; and
      determine second braking force of an auxiliary braking source from the motor or the hydraulic pressure brake system for each of the driving wheels based on a target speed set with respect to the hill descent control and a speed of each of the driving wheels;
   a second controller configured to operate the motor to output any corresponding one of the first braking force and the second braking force; and
   a third controller configured to operate the hydraulic pressure brake system to output another corresponding one of the first braking force and the second braking force,
   wherein the inclination variation width corresponds to a deviation range calculated based on downhill road inclination distribution with a predetermined reliability factor based on the average inclination.

12. The eco-friendly vehicle of claim 11, wherein, when the motor is connected to each of the driving wheels through a differential gear, the main braking source is the motor and the auxiliary braking source is the hydraulic pressure brake system.

13. The eco-friendly vehicle of claim 11, wherein, when different motors are connected to each of the driving wheels, the main braking source is the hydraulic pressure brake system and the auxiliary braking source is the different connected to each of the driving wheels.

14. The eco-friendly vehicle of claim 11, wherein the motor outputs any one of the first braking force and the second braking force through regenerative brake.

15. The eco-friendly vehicle of claim 11, wherein the first controller is configured to obtain wheel acceleration based on an average speed of four wheels included in the eco-friendly vehicle and obtain the downhill road inclination based on a value obtained by subtracting the wheel acceleration from an acceleration sensor value.

16. The eco-friendly vehicle of claim 11, wherein the first controller is configured to obtain the average inclination using an average of the downhill road inclination present in a moving window with a predetermined time length and obtain the inclination variation width based on the downhill road inclination distribution with the predetermined reliability factor based on the average inclination in the moving window, and wherein the moving window corresponds to a time window that is continuously shifting to a more recent time.

17. The eco-friendly vehicle of claim 11, wherein the first braking force corresponds to a value obtained by subtracting a control margin corresponding to the inclination variation width from braking force corresponding to the average inclination.

18. The eco-friendly vehicle of claim 11, wherein the first controller is configured to obtain speed error for each of the driving wheels by subtracting a linear speed for a vehicle wheel, obtained based on the speed for each of the driving wheels, from the target speed and determine the second braking force for each of the driving wheels to reduce the speed error.

19. The eco-friendly vehicle of claim 11, wherein the first braking force is determined in the form of feedforward control and the second braking force is determined in the form of feedback control.

* * * * *